United States Patent [19]

Lummis et al.

[11] Patent Number: 4,872,749

[45] Date of Patent: Oct. 10, 1989

[54] LENS FOR VIDEO TERMINAL SCREEN

[75] Inventors: David J. Lummis, Hertfordshire, England; Jon D. Masso, Whitinsville, Mass.

[73] Assignee: American Optical Corporation, Southbridge, Mass.

[21] Appl. No.: 650,922

[22] Filed: Sep. 14, 1984

[51] Int. Cl.[4] .............................................. G02C 7/10
[52] U.S. Cl. ....................................... 351/44; 351/45
[58] Field of Search ............................ 351/44, 45, 163

[56] References Cited

U.S. PATENT DOCUMENTS 3,078,343  2/1963  Schulz et al.
4,049,339  9/1977  Ledan ..................................... 351/45
4,470,673  9/1984  Gilson et al. .......................... 351/44

FOREIGN PATENT DOCUMENTS 2317642 10/1974  Fed. Rep. of Germany.
2445794  4/1976  Fed. Rep. of Germany.
WO85/05701 12/1985  PCT Int'l Appl.
2055225  2/1981  United Kingdom.

OTHER PUBLICATIONS

Coblentz et al, Spectral-Transmissive Properties and Use of Colored Eye-Protective Glasses, 6/1938.
Murray et al, Potential Health Hazards of Video Display Terminals; Jun. 1981.
Cornsweet, *Visual Perception*, pp. 249–254 and 332–339 (1970).

Primary Examiner—Rodney B. Bovernick
Assistant Examiner—P. M. Dzierzynski
Attorney, Agent, or Firm—Fishman, Dionne & Cantor

[57] ABSTRACT

A method and lens are disclosed for improving the visual comfort and perceived vision of a person viewing an image transmitted from a video display terminal. The use of a lens tint complementary to the image color on the terminal screen is employed to improve screen contrast and reduce fatigue.

11 Claims, 3 Drawing Sheets

BRIGHTNESS VS INTENSITY $B = I/(1+I)$

LENS FOR VIDEO TERMINAL SCREEN

BACKGROUND OF THE INVENTION

In the design of computers, word processors and other devices using a cathode ray tube (CRT) or video display terminal (VDT), it is common practice to produce a mono-color image on the screen of the tube. For instance, a common phosphor used on the screen to be stimulated by the electron beam emits the color green; the background is colored dark green, and the letters and images produced on the screen by the computer are bright green. Unfortunately, the use of such a mono-color screen can lead to considerable eye fatigue on the part of the operator, not only because of the continual impression on the eye, but because of the nervous tension produced in attempting to read the image on the screen. Attempts have been made in the past to reduce this fatigue by using colored filters in front of the screen, but the systems developed have been expensive, and/or have not operated particularly well in reducing fatigue in the operator. These and other difficulties experienced with the prior art attempts to solve this problem have been obviated in a novel manner by the present invention.

It is, therefore, an object of the present invention to provide a lens which reduces operator eye fatigue when a cathode ray tube is used in a piece of equipment, and which increases the contrast and the ability of the operator to read the image.

A further object of the invention is the provision of a method for improving the visual comfort and perceived vision of a person viewing an image on a video display terminal.

With these and other objects in view, as will be apparent to those skilled in the art, the invention resides in the lenses and method set forth in the specification and covered by the claims appended hereto.

SUMMARY OF THE INVENTION

In general, the invention consists of a lens, preferably a spectacle lens, which, when interposed between the screen of a CRT or VDT and the eye of a viewer, improves the visual comfort and perceived vision of the viewer. In particular, said lens is treated with a tint integrated with said lens to act on the image passing between the screen and the eye, the tint serving to reduce the intensity of the image reaching the eye and increasing the contrast between the various degrees of shades as perceived and recorded by the eye and the brain. More specifically, said tint forms a filter which passes a color that is the complement of the color transmitted by the CRT screen and which, in effect, tends to particularly block the color transmitted by the screen.

BRIEF DESCRIPTION OF THE DRAWINGS

The character of the invention may be better understood by reference to one of the accompanying drawings, in which.

DESCRIPTION OF THE PREFERRED EMBODIMENTS

The present invention is based upon the unexpected and surprising discovery that a lens tinted with a color complementary to that transmitted by a terminal screen (CRT or VDT) improves the visual comfort and perceived vision of a person viewing an image on said screen through such a lens. In addition to other advantages, applicant has discovered that the use of a complementary color tint for such a lens improves the contrast of the screen display.

Figure 1:
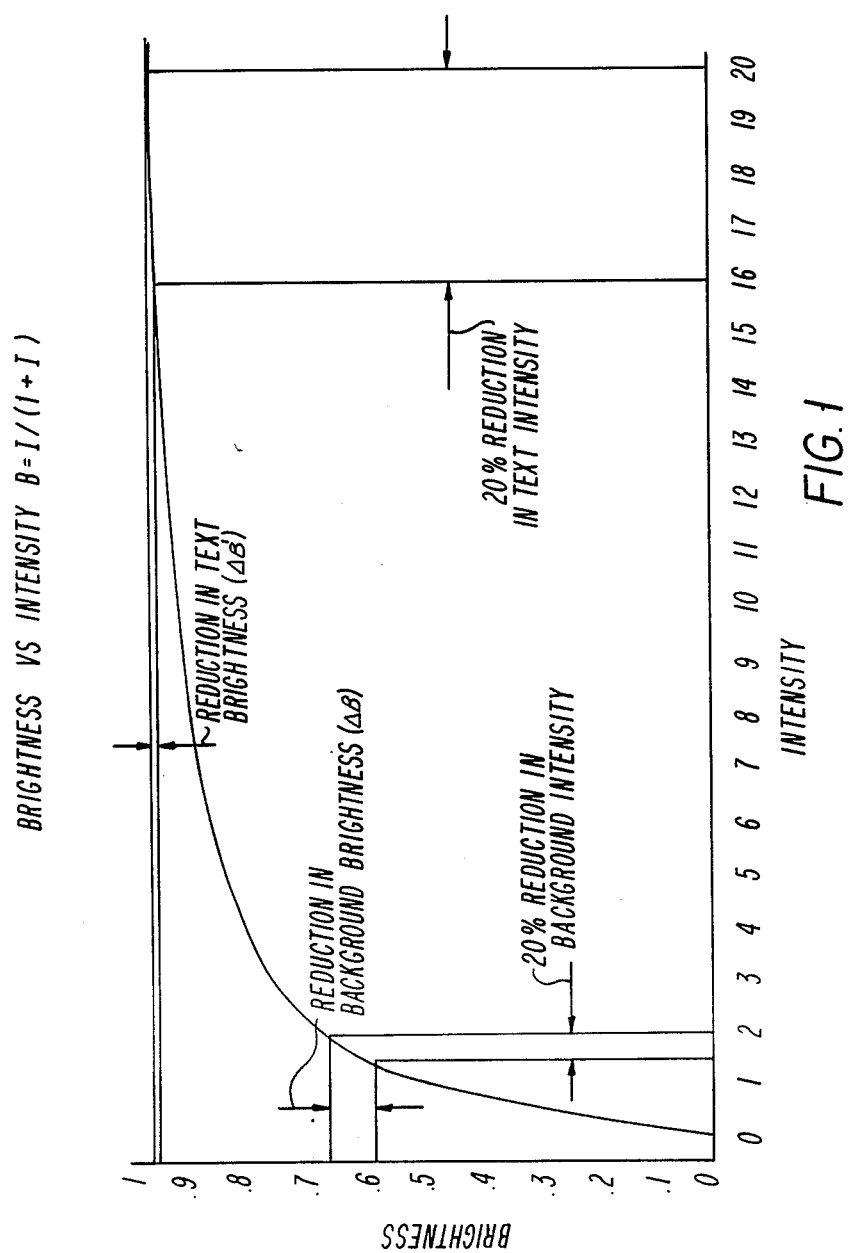
FIG. 1 is a brightness vs. intensity chart.

While this phenomena is not fully understood, it is believed that this occurs because the perception of brightness is not a linear function of the intensity of the light incident on the eye. This is shown graphically in FIG. 1. See T. Cornsweet, *Visual Perception,* Academic Press, p. 334 (1970). Thus, even though the tint in the lens reduces the intensity of both the text (or image) and the background equally (i.e. the same percentage), the reduction in the perceived brightness of the background is greater than that of the text as shown by the difference in magnitude between B and B'. The dark background appears darker without any significant reduction in text brightness, making the text stand out more clearly. In addition, color contrast is improved as well as brightness contrast by tailoring the spectral properties of the light transmitted by the lens to complement the color of the light emitted by the screen phosphor. Thus, a green image will appear against a background having a blue-red cast when viewed through a magenta lens. The tinted lens also reduces glare emanating from the terminal screen, as well as from other light sources. However, the transmittance of the lens should not be so low (i.e. not less than 65%), nor the color so saturated (i.e. not greater than 30%) as to cause significant or displeasing color distortion or visibility reduction when viewing the surrounding environment.

The method of operation of the invention and its advantages can be readily understood. A person viewing a terminal screen, such as a cathode ray tube or video display terminal, observes the image on the screen through a lens (or lenses) which is interposed between the viewer's eyes and the screen. The lens may be made of conventional spectacle lens material, such as glass or plastic, particularly polymers of diethylene glycol bis (allyl-carbonate). The lens is particularly advantageous when placed close to the viewer's eyes, such as when incorporated in a pair of eyeglasses or the like. The image observed by the viewer (i.e. the light from the screen) is filtered by the complementary lens tint as it passes through the lens to the eye and perception of the image is thereby enhanced. When the terminal screen uses a green phosphor which results in a screen image consisting of various shades of green, the tint incorporated into the lens is magenta. The tint would be a sky-blue color to go with an amber image on the screen or a neutral grey color for use with a black-and-white visual image on the video display terminal.

Figure 2:
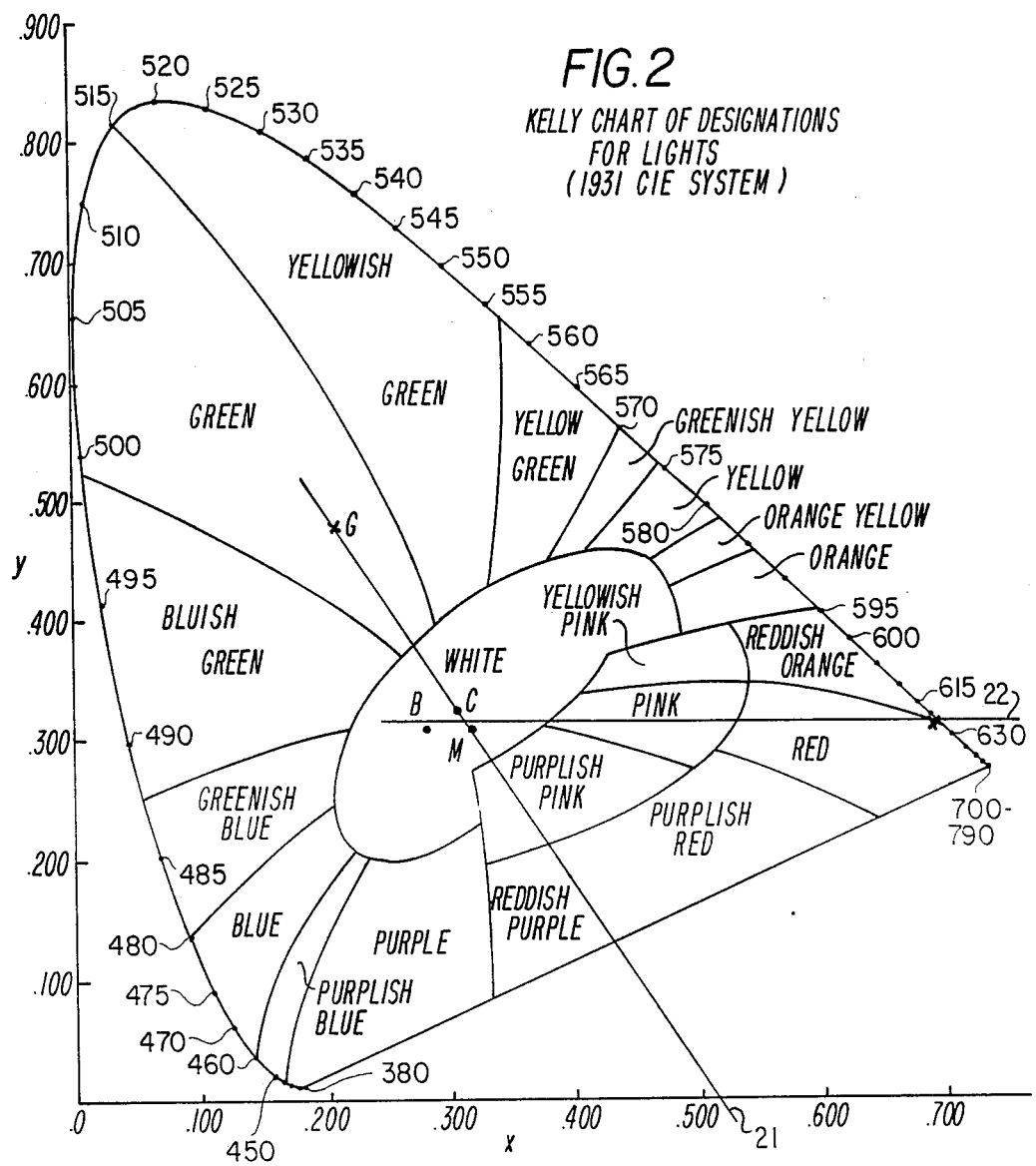
FIGS. 2 and 3 are C.I.E. Chromaticity Diagrams (color charts).

In the preceding description, the terms "complement" and "complementary colors" are used. The simplest definition is that, when two colors can be added together to obtain white, they are called "complementary". Examples are red/blue and yellow/violet. The complementary color to green is magenta. More precisely, colors may be defined by a point (x, y) on a standard C.I.E. Chromaticity Diagram, such as shown in FIG. 2. This drawing shows the diagram with the areas labeled according to their common usage of color designation. The point indicated by "C" represents white when the illuminant is average daylight, and is so-called "Illuminant C". The further a particular color is from the point C and the closer to the edge of the chart, the more saturated or the more pure the color is. In a more general sense, any color with (x,y) chromaticity coordinates falling on a straight line through point C (or approximately through point C) and the image color coordinate and on the opposite side of point C may be said to be complementary. Thus, points G and M on line 21 would be considered complementary for purposes of this invention, as would points A and B on line 22.

Figure 3:
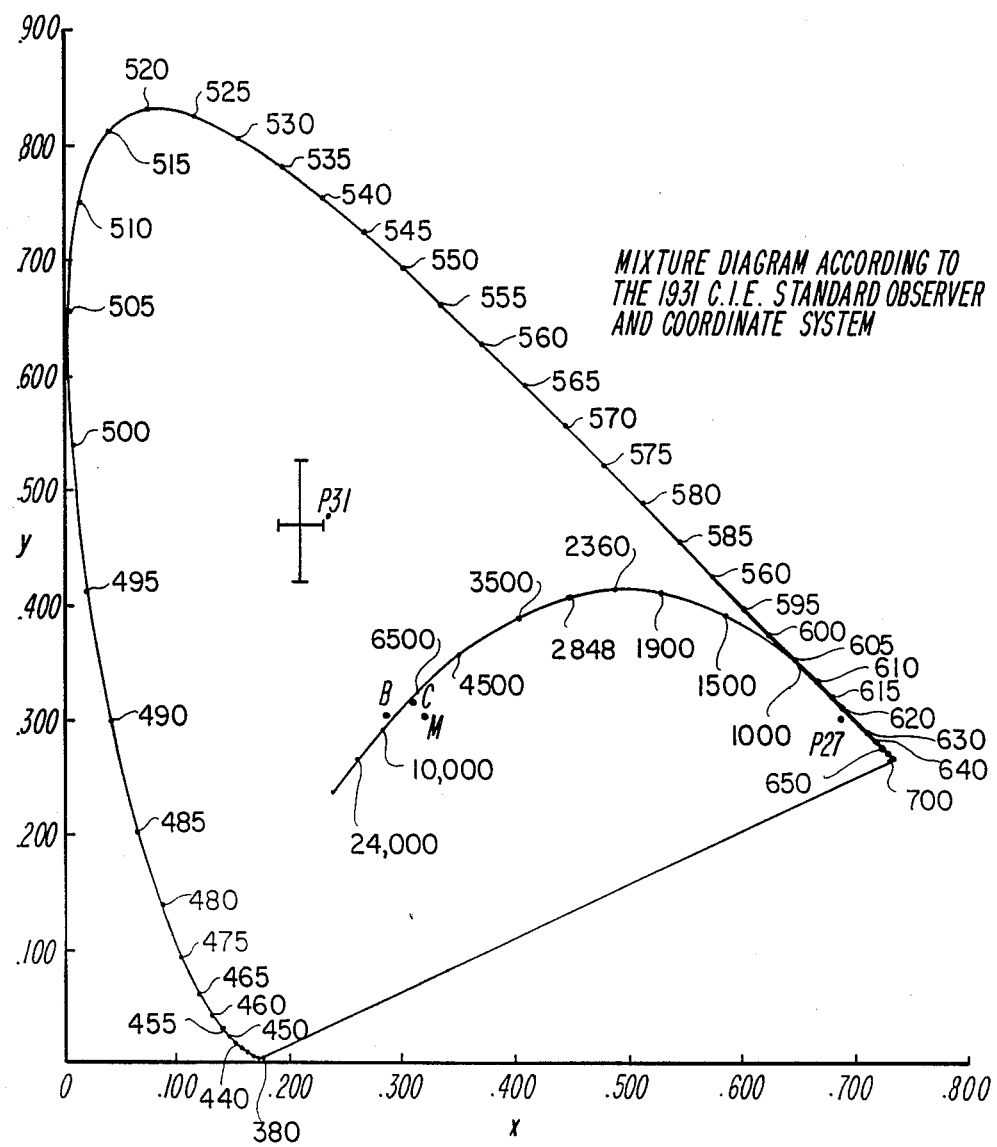

In FIG. 3, the chromaticities of two phosphors P31 (green) and P27 (red-orange) that are known to be used for video display terminals are shown along with the chromaticities of a magenta (M) and a blue (B) tinted lens. It can be seen that, although it is not nearly as saturated, the magenta is opposite the P31 and the blue is roughly opposite the P27. A black and white display would, of course, be used with a grey lens which reduces the overall light intensity, but does not affect the color.

Since an ophthalmic lens can also produce spurious images by reflectances from the lens surface(s) of peripheral light sources, such as overhead lighting or window light, which are distracting and interfere with clear vision, these "ghost" images are advantageously reduced by the use of an anti-reflective coating on the lens. In addition, such treatment also reduces "veiling glare", caused by light coming from behind the viewer or light reflected from the viewer's face or eyes, which creates an overall background light level super-imposed on the terminal display and interferes with clear vision. Lenses of the present invention may also be advantageously treated with an ultra-violet absorbing compound to filter out more than 90%, and preferably more than 99%, of the ultra-violet radiation between 300 nm and 400 nm. Infra-red absorbers and scratch resistant coatings may also be applied to the lenses.

The present invention uses, therefore, a tinted lens which has been tinted to about 70-85% transmittance with a color complementary to the color of the image transmitted by the terminal screen. Preferably, said lens has also been treated with an anti-reflective coating. As has been stated, the color of the tint is selected to be the complementary color to that of the light emitted by the phosphor of the terminal screen being viewed. In other words, for a green video display terminal, a magenta (or minus green) tint is used. A blue tint is used for an amber display and a grey tint is used for a black-and-white display.

The anti-reflective coating is such that the reflectance of a clear untinted lens would be reduced from 7.7% to around 3.0% or less (both surfaces included), and the transmittance increased from about 92% to about 95%. Ordinarily, a tinted lens will realize an increased transmittance of about 2 to 7%, and a decreased reflectance of about 2 to 7%. The anti-reflective coating is defined as any coating which reduces the average visual reflectance of an optical surface from it's normal uncoated value. Any conventional anti-reflective system may be employed, including a single layer magnesium fluoride coating on glass, bi-layer coatings for glass or plastic, and multilayer coatings. Preferably, the coating will be a bi-layer coating which has an additional thin third layer to promote adhesion between the plastic lens and the anti-reflective coating.

The lenses of the present invention may be produced according to conventional tinting and coating techniques employed in the industry. For example, the lens may be immersed in the tinting dye for approximately 20 seconds at a temperature of 210° F. to produce a tint having an average visual transmittance of about 75%. After washing and drying, the lens may then be placed in a vacuum coating chamber where a two-layer, non-quarter-wave optical thickness, anti-reflective coating is applied. After coating, the average visual transmittance is approximately 80%. Then, the lens may be edged to shape and inserted into an eyeglass frame in the normal manner.

When the lens is to be used with a terminal having a green phosphor display, the color tint should be magenta. Such a tint may be obtained with a dye bath containing an equal mixture (about 100 ml each) of dye concentrates from Brain Power, Inc. (BPI) of Miami, FL of "AO Heather" and "AO Blueberry", in 1000 ml water, the immersion taking 20 seconds to reach 75% visual transmittance (VT). In the case of an amber VDT display, the procedure is as described above except that the colorant dye used is BPI "Swiss Pastel Twilight Blue" and the time required to reach a 75% VT is typically one minute. To produce a grey lens for use with a black and white VDT, the procedure is similar to that described above, except that the colorant substance used is BPI "black" and the time required to reach a 75% VT is typically 15 seconds. Many other commercially available dyes can advantageously be selected, two examples of which are Atlantic Violet 5R-SE which provides a magenta tint and Atlantic Blue AC-E which provides a blue tint, both available from Atlantic Chemical Corp.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A method for improving the visual comfort and perceived vision of a person viewing a monochromatic phosphor image on a video display terminal screen, the monochormatic phosphor image being formed by radiation at a primary phosphor emission which comprises causing said person to view said image through a spectacle lens which has been tinted a color which is approximately the complement to the color of said monochromatic phosphor image wherein said spectacle lens blocks said radiation at the primary phosphor emission and transmits light at other wavelengths.

2. A method as recited in claim 1 wherein the lens has been treated so as to transmit approximately 70% to 85% of incident visible light.

3. A method as recited in claim 1 wherein the lens has been treated with an anti-reflective coating which increases the transmittance of said lenses by about 2 to 7% and decreases the reflectance of said lenses by about 2 to 7%.

4. A method as recited in claim 1 wherein the complement is defined as the color indicated on the chart of FIG. 2 as a point situated approximately on the opposite side of the center point or white light point of said chart from the point which defines the image color.

5. A method as recited in claim 1 wherein the complement is defined as the color indicated on the chart of FIG. 2 by a chromaticity coordinate situated approximately on the line passing through the coordinate which defines the image color and the white light or C coordinate and situated on the side opposite said white light or C coordinate from the image color coordinate.

6. A method as recited in claim 5 wherein the image color is amber (red-orange) and the lens is tinted blue.

7. A method as recited in claim 5 wherein the image color is green and the lens is tinted magenta.

8. A method as recited in claim 5 wherein the lens is additionally treated with compositions selected from the group consisting of ultra-violet absorbers, infra-red absorbers, scratch resistant coatings, and combinations thereof.

9. In combination, a video display terminal screen capable of producing a monochromatic phosphor image for viewing by a person, the monochormatic phosphor image being formed by radiation at a primary phosphor emission and a spectacle lens through which said person views said monochormatic phosphor image, said spectacle lens being tinted a color which is approximately the complement to the color of said image wherein said spectacle lens blocks said radiation at the primary phosphor emission and transmits light at other wavelengths.

10. A combination according to claim 9 wherein said image is amber and said lens is tinted blue.

11. A combination according to claim 9 wherein said image is green and said lens is tinted magenta.

* * * * *